United States Patent
Bailey et al.

(10) Patent No.: US 6,933,151 B2
(45) Date of Patent: *Aug. 23, 2005

(54) DIAGNOSTIC SYSTEM FOR MONITORING CATALYST PERFORMANCE

(75) Inventors: Owen H. Bailey, Concord, OH (US); Jean J. Balland, Metz (FR); Sergio Quelhas, Ann Arbor, MI (US); Bart Schreurs, Athus (BE)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/960,817

(22) Filed: Oct. 7, 2004

(65) Prior Publication Data

US 2005/0084973 A1  Apr. 21, 2005

Related U.S. Application Data

(63) Continuation of application No. 09/927,718, filed on Aug. 10, 2001, now Pat. No. 6,803,236.

(51) Int. Cl.[7] ....................... G01N 31/10; G01N 27/04; F01N 3/00
(52) U.S. Cl. ............................ 436/37; 60/276; 422/83; 422/90; 422/94; 422/98; 436/116; 436/118; 436/119; 436/122; 436/127; 436/137; 436/149; 436/151
(58) Field of Search ................ 436/37, 116, 118–119, 436/122, 127, 137, 149, 151; 60/274, 276; 422/83, 90, 94, 98

(56) References Cited

U.S. PATENT DOCUMENTS

| | | |
|---|---|---|
| 5,077,970 A | 1/1992 | Hamburg |
| 5,159,810 A | 11/1992 | Grutter et al. |
| 5,268,086 A | 12/1993 | Hamburg et al. |
| 5,369,956 A | 12/1994 | Daudel et al. |
| 5,461,857 A | 10/1995 | Itou et al. |
| 5,509,267 A | 4/1996 | Theis |
| 5,546,004 A | 8/1996 | Schmelz |
| 5,724,808 A | 3/1998 | Ito et al. |
| 5,727,385 A | 3/1998 | Hapburn |
| 5,832,721 A | 11/1998 | Cullen |
| 5,896,743 A | 4/1999 | Griffin |
| 5,927,068 A | 7/1999 | Schenk |
| 5,974,788 A | 11/1999 | Hapburn et al. |
| 5,990,038 A | 11/1999 | Suga et al. |
| 6,009,742 A | 1/2000 | Balko |
| 6,171,565 B1 | 1/2001 | Hohne et al. |
| 6,529,808 B1 | 3/2003 | Diem |
| 6,585,872 B2 * | 7/2003 | Donelon et al. ............ 204/424 |
| 6,803,236 B2 * | 10/2004 | Bailey et al. ................. 436/37 |

FOREIGN PATENT DOCUMENTS

| | | |
|---|---|---|
| EP | 0915244 A2 | 12/1999 |
| WO | 0000728 | 6/2000 |

* cited by examiner

*Primary Examiner*—Arlen Soderquist
(74) *Attorney, Agent, or Firm*—Jimmy L. Funke

(57) ABSTRACT

A diagnostic system for monitoring catalyst performance in an exhaust system comprises a plurality of treatment devices catalytically treating an exhaust gas stream, and a plurality of gas sensors for monitoring the catalyst performance of the treatment devices to determine when sulfur poisoning occurs. An on-board diagnostic system receives signals from the gas sensors, and, based upon response time differentials between sensors, determines whether the treatment devices are experiencing sulfur poisoning.

8 Claims, 4 Drawing Sheets

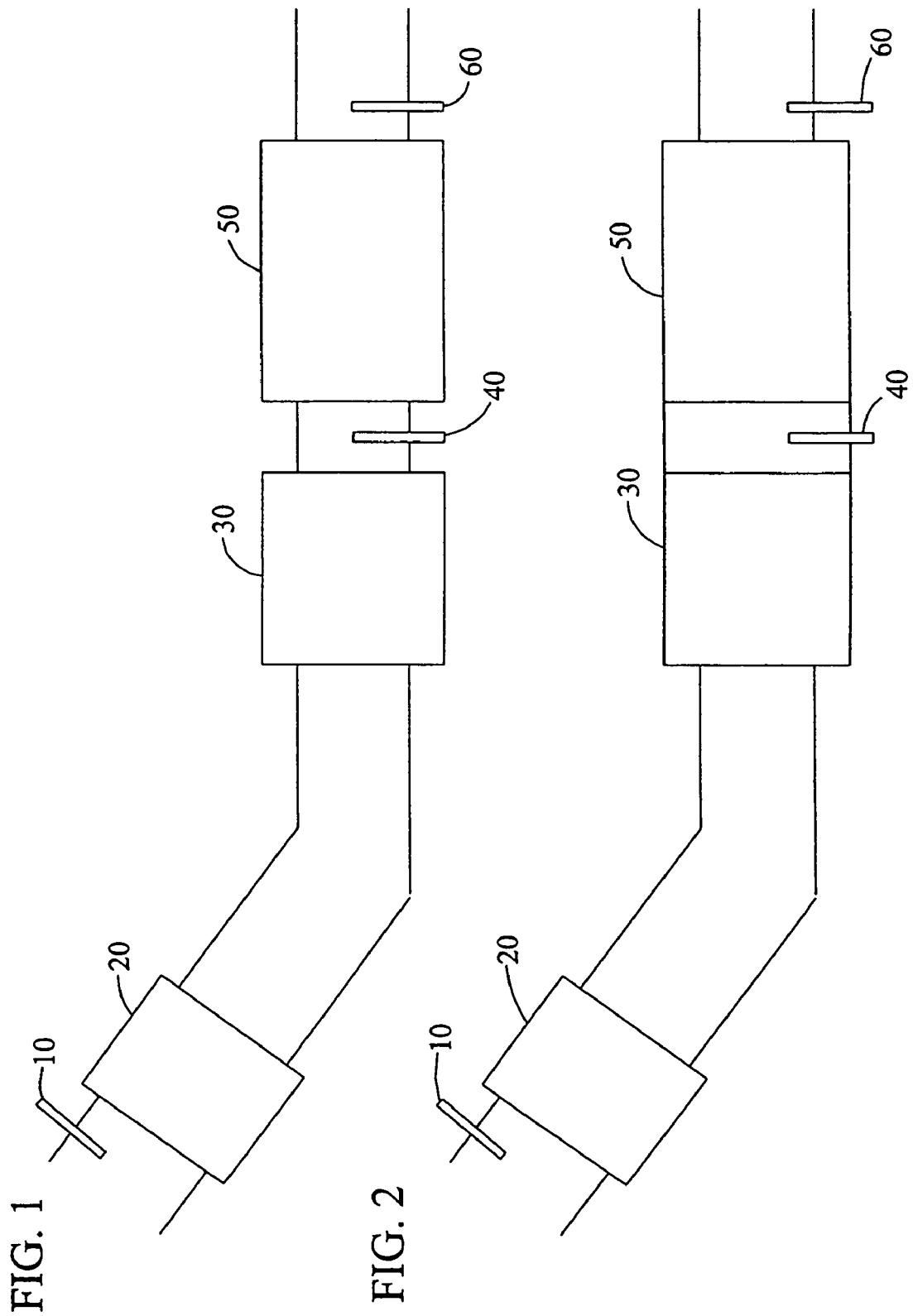

DIAGNOSTIC SYSTEM FOR MONITORING CATALYST PERFORMANCE

CROSS REFERENCE TO RELATED APPLICATION

The present application is a continuation application of U.S. application Ser. No. 09/927,718 filed on Aug. 10, 2001, now U.S. Pat. No. 6,803,236.

TECHNICAL FIELD

This disclosure relates to exhaust systems, and, more particularly, to a diagnostic system for exhaust systems.

BACKGROUND

Conventional on-board diagnostic systems monitor emission control devices, such as catalytic converters, oxygen sensors and nitrogen oxide ($NO_x$) sensors, to ensure that regulatory emission standards are met. Based upon the on-board diagnostic system's information, an engine control unit determines the air/fuel ratio ("A/F ratio") to maximize the engine's performance, e.g., maintaining an efficient control of fueling and combustion to ensure high conversion levels of nitrogen oxides, carbon monoxide, and hydrocarbons present in exhaust gas streams. In some regions of the world, gasoline mixtures contain sulfur, e.g., in an amount of approximately 300 to approximately 800 parts per million, as an additive, or, most likely, as an impurity. Catalytic converters that are continuously exposed to sulfur will perform below desired standards, e.g., efficiency and emission control, because the catalyst deposited on the catalyst substrate of the catalytic converter will become contaminated by the sulfur, i.e., experience "sulfur poisoning".

Conventional on-board diagnostic systems for direct injection gasoline systems and lean burn systems monitor catalyst performance of emission control devices using a single sensor or a combination of sensors. The combination of sensors can monitor both the oxygen storage capacity and nitrogen oxide conversion efficiency of the catalysts. However, one drawback is that the sensors cannot monitor sulfur poisoning of the catalysts.

Another drawback is the insensitivity of the combination of sensors to accurately diagnose nitrogen oxide conversion efficiency. Typically, nitrogen oxide adsorber catalysts must include significant levels of oxygen storage capacity materials, and nitrogen oxide adsorber materials, to function effectively. However, nitrogen oxide adsorber materials possess a greater sensitivity to thermal deactivation than oxygen storage capacity materials. As a result, the thermal deactivation differential between the two materials reduces the accuracy of monitoring the oxygen storage capacity of the catalysts in the system. Since the nitrogen oxides storage capacity of a catalyst is used to diagnose its nitrogen oxides conversion efficiency, the thermal deactivation differential prevents an accurate diagnosis of the nitrogen oxide storage/conversion efficiency, and determination as to whether sulfur poisoning has occurred.

In contrast, on-board diagnostic systems for conventional diesel systems have not been used extensively; however, some diesel systems employ one or more thermistors or thermocouples to monitor temperatures within the exhaust system. The thermistors and/or thermocouples can be used to sense that temperatures within the diesel system are effective for operation and/or ensure the diesel system is protected from exposure to excessive operating temperatures. In addition, the thermistors and/or thermocouples can also be used to determine approximately when exothermic catalytic reactions, such as an oxidation reaction, taking place in a catalytic converter, decrease. This decrease can indicate that the catalyst's efficiency is decreasing, which signals the need to replace the catalytic converter. Consequently, emissions and catalyst performance for diesel systems are not monitored accurately and sulfur poisoning cannot be predicted.

Consequently, there exists a need for an apparatus and method for monitoring catalyst performance using on-board diagnostics in direct injection gasoline systems, lean burn systems and diesel systems.

SUMMARY

The drawbacks and disadvantages of the prior art are overcome by the embodiments of the catalyst performance diagnostics system, method for monitoring catalyst performance, and method for monitoring and treating hydrocarbon breakthrough in an exhaust system. The catalyst performance diagnostics system comprises a plurality of gas sensors disposed in fluid communication with a plurality of treatment devices. A gas sensor is disposed before, after, and/or in between, and/or within one or more of the treatment devices. Further, an on-board diagnostic system is coupled to the plurality of gas sensors.

The method for monitoring catalyst performance comprises introducing and passing an exhaust gas stream through a plurality of treatment devices and gas sensors within an exhaust system. The exhaust gas stream is monitored by one or more sensors as the stream passes through one or more treatment devices. At least one sensor is disposed before, after, and/or in between, and/or within one or more treatments devices. The treatment devices are desulfated based on response time differential measurements taken by the sensors.

The method for monitoring and treating hydrocarbon breakthrough in an exhaust system comprises introducing and passing an exhaust gas stream through a plurality of treatment devices and a plurality of gas sensors within an exhaust system. The air to fuel ratio of the exhaust gas stream is adjusted, which the gas sensors monitor. When the gas sensors detect an emission breakthrough, the air to fuel ratio is adjusted and the treatment devices catalytically treat the emission breakthrough.

BRIEF DESCRIPTION OF THE DRAWINGS

Referring now to the Figures, which are meant to be exemplary, not limiting, and wherein like elements are numbered alike in the several figures.

FIG. 1 illustrates one embodiment of a system for monitoring and diagnosing catalyst performance of a plurality of treatment devices in an exhaust system of a direct injection gasoline system or lean burn system.

FIG. 2 illustrates an alternative embodiment of the system for monitoring and diagnosing catalyst performance as shown in FIG. 1.

DESCRIPTION OF THE PREFERRED EMBODIMENT

Figure 3:
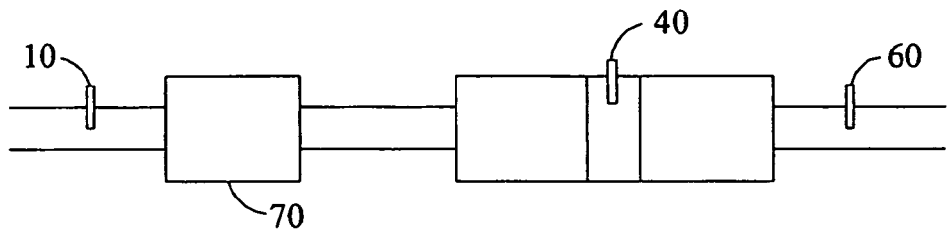
FIG. 3 illustrates an embodiment of a system for monitoring and diagnosing catalyst performance of a plurality of treatment devices in an exhaust system for a diesel system.
Figure 4:
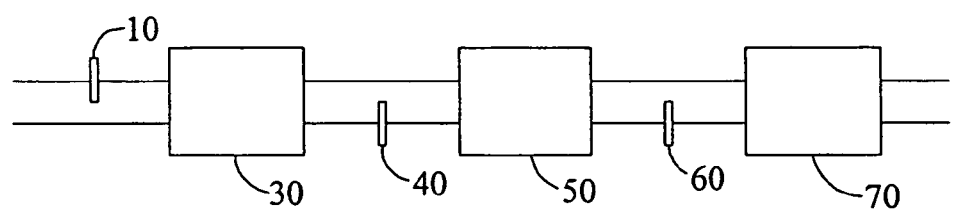
FIG. 4 illustrates an alternative embodiment of the system for monitoring and diagnosing catalyst performance as shown in FIG. 3.
Figure 5:
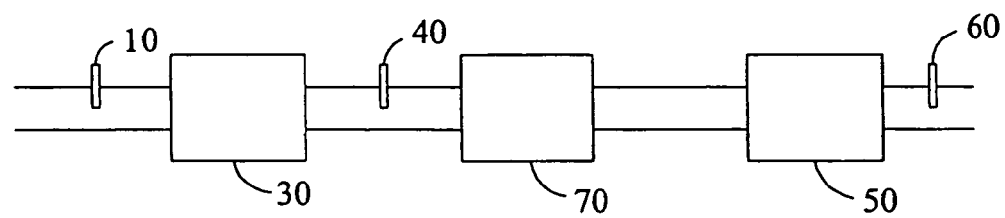
FIG. 5 illustrates an alternative embodiment of the system for monitoring and diagnosing catalyst performance as shown in FIG. 3.
Figure 6:
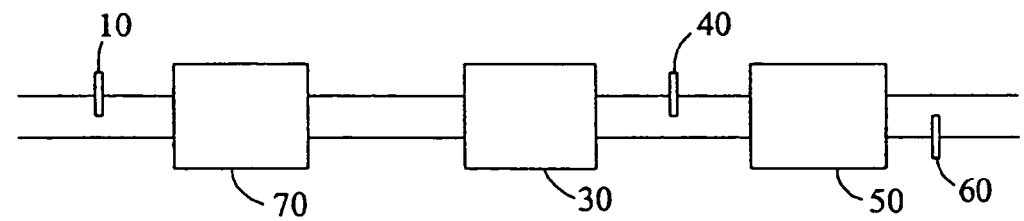
FIG. 6 illustrates an alternative embodiment of the system for monitoring and diagnosing catalyst performance as shown in FIG. 3.
Figure 7:
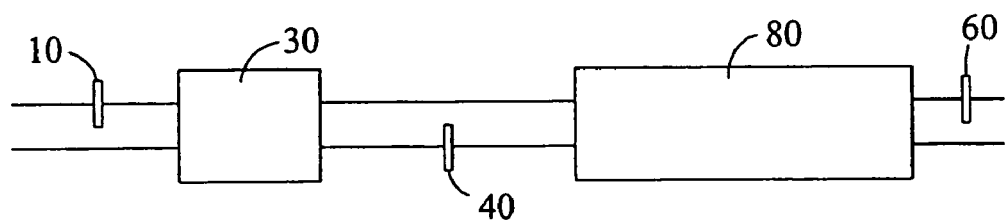
FIG. 7 illustrates an alternative embodiment of the system for monitoring and diagnosing catalyst performance as shown in FIG. 3.
Figure 8:
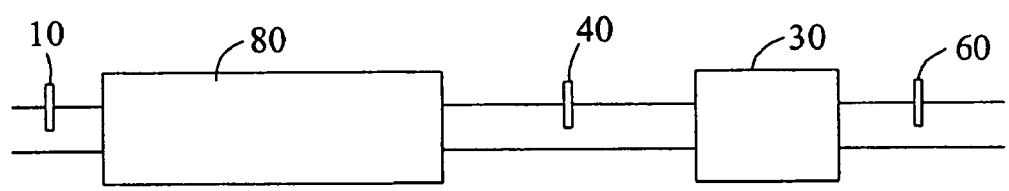
FIG. 8 illustrates an alternative embodiment of the system for monitoring and diagnosing catalyst performance as shown in FIG. 3.

A control strategy for providing enhanced $NO_x$ adsorber diagnostics comprises a plurality of treatment devices for catalytically treating an exhaust gas stream, and a plurality of sensors for sensing the catalyst performance of the treatment devices to determine when sulfur poisoning occurs. The plurality of treatment devices can further comprise a first treatment device, a second treatment device, and a third treatment device for operation within an exhaust system. The plurality of sensors further comprises at least three gas sensors configured to operate cooperatively with the treatment devices. Based on the sensor readings, an on-board diagnostic system can monitor the catalyst performance of the entire exhaust system. In turn, an engine control unit can regenerate the catalyst materials, prevent hydrocarbon breakthrough, and desulfate the treatment devices based upon the on-board diagnostic system's data from the sensors.

A control strategy for direct injection gasoline systems, or similar lean burn systems, monitors the sulfur poisoning of the exhaust system by measuring the catalyst performance of the treatment devices. Typically, sulfur poisoning begins at the inlet of a treatment device, and subsequently proceeds through the length of the treatment device. The extent of sulfur poisoning of the entire system can be determined by monitoring a portion of the entire system, e.g., one of a plurality of treatment devices. In response to the sensor readings, the on-board diagnostic system can signal the engine control unit to adjust the A/F ratio to reduce the sulfur (stored as sulfates) and regenerate the catalyst material of the treatment devices to eliminate the sulfur poisoning. Alternatively, one or more gas sensors can be disposed within one or more treatment devices. A sensor disposed within a treatment device can monitor a portion of the volume of that particular treatment device. The sensor readings can be used in combination with other sensors to determine catalyst performance and the extent of sulfur poisoning within the system.

In an alternative embodiment of the system, the on-board diagnostic system can monitor catalyst performance, minimize emissions breakthrough, and desulfate treatment devices for a diesel system, or similar lean burn system. For example, the diesel system can employ a plurality of gas sensors and a plurality of treatment devices, in which a treatment device can optionally comprise a particulate filter device for use in a diesel system.

The treatment devices can comprise any emissions treatment devices employed for catalytically treating exhaust gas, and, more specifically, noxious exhaust gas components such as hydrocarbons, nitrogen oxides, sulfur, and the like. The treatment device can be a catalytic converter employing one or more catalyst substrates comprising a catalyst or a combination of catalysts, such as in a three way catalyst substrate, or a diesel particulate filter employing one or more catalyst substrates, and/or other type of support, comprising a catalyst or combination of catalysts. The catalyst substrates can comprise any material designed for use in a spark ignition or diesel engine environment, and have the following characteristics: (1) capable of operating at temperatures up to about 1,200° C.; (2) capable of withstanding exposure to hydrocarbons, nitrogen oxides, carbon monoxide, carbon dioxide, and/or sulfur, and other exhaust gas constituents; and (3) having sufficient surface area and structural integrity to support the desired catalyst. Some possible materials include cordierite, silicon carbide, metallic foils, alumina sponges, porous glasses, and the like, and mixtures comprising at least one of the foregoing materials. Some ceramic materials include "HONEY CERAM", commercially available from NGK-Locke, Inc, Southfield, Mich., and "CELCOR", commercially available from Corning, Inc., Corning, N.Y.

Although the catalyst substrates can have any size or geometry, the size and geometry are preferably chosen to optimize the surface area in the given converter design parameters. Typically, the catalyst substrate has a honeycomb geometry, with the combs being any multi-sided or rounded shape, with substantially square, hexagonal, octagonal or similar geometries preferred due to the ease of manufacturing and increased surface area. In the alternative, the catalyst substrate can also have a geometry such as a metallic shape (e.g., delta shape) as is known in the art.

Disposed on and/or throughout the catalyst substrates is a catalyst for converting exhaust gases to acceptable emissions levels as is known in the art. The catalyst may comprise one or more catalyst materials that are wash coated, imbibed, impregnated, physisorbed, chemisorbed, precipitated, or otherwise applied to the catalyst substrate. Possible catalyst materials include metals, such as platinum, palladium, rhodium, iridium, osmium, gold, ruthenium, tantalum, zirconium, yttrium, cerium, copper, nickel, zinc, molybdenum, vanadium, tungsten, iron, cobalt, titanium, niobium, rhenium, and mixtures, alloys and oxides, and combinations comprising at least one of the foregoing metals, and other conventional catalysts.

The catalyst substrates can support catalyst material configured to catalyze specific exhaust gas components such as nitrogen oxides, sulfur compounds, and the like. For example, under lean A/F operating conditions a nitrogen oxides adsorber material acts first to oxidize NO to $NO_2$. The $NO_2$ further reacts with the alkali and alkaline earth materials of the catalyst washcoat to form stable nitrate salts. Under rich A/F operating conditions, the nitrates become thermodynamically unstable, and the stored nitrogen oxides are released for catalysis, whereupon the nitrogen oxides are reduced to nitrogen gas, and exit an exhaust port (not shown).

To monitor the catalyst performance of the exhaust system, a plurality of gas sensors are employed, and positioned within the exhaust system before, after, and/or in between, and/or within one or more of the treatment devices. The sensors, which can comprise any conventional design, are preferably amperometric mode exhaust sensors, such as switch type sensors, wide range air/fuel ratio sensors ("WRAF"), linear air/fuel ratio sensors, lambda sensors, and combinations comprising at least one of the foregoing sensors and the like. Amperometric mode exhaust sensors typically monitor the concentration of exhaust gas elements such as, e.g., oxygen, by pumping the gaseous constituent through an electrochemical cell using an applied voltage. A gas diffusion-limiting barrier creates a current limited output at a level proportional to the gaseous constituent's content in the exhaust gas. The current limited output indicates whether the exhaust gas is qualitatively rich or lean, and also quantitatively measures the A/F ratio of the exhaust gas.

The gas sensors typically comprise one or several electrochemical cells, each comprising a pair of electrodes disposed on opposite sides of and in communication with an electrolyte having one or more leads electrically connecting the electrodes through vias to an external load. The sensor may further comprise reference gas channel and/or storage area, heater(s), leads, ground plane, dielectric layer(s), contact pad(s), protective coating(s), and the like. When two electrolyte cells are employed, one electrochemical cell operates in a potentiometric mode, and serves as a reference cell, while the other electrochemical cell operates in an amperometric mode, and serves as a gas-pumping cell, such as an oxygen-pumping cell.

The particular sensor components and materials are thus chosen based upon the operating conditions (such as, e.g., operating temperatures, exposure to gas constituents), as well as the type(s) of gaseous species being sensed. Typically, a gas sensor comprises at least one solid and/or porous electrolyte material comprising a metal oxide, such as zirconia, or the like, and optionally stabilized with calcium, barium, yttrium, magnesium, aluminum, lanthanum, cesium, gadolinium, and the like, and oxides thereof, as well as combinations comprising at least one of the foregoing electrolyte materials. Disposed on opposite sides of the electrolyte(s) are electrodes that comprise a catalyst effective in reacting with the desired gas species. Typically, the electrodes comprise a metal such as platinum, palladium, rhodium, iridium, ruthenium, gold, osmium, zirconium, yttrium, cerium, calcium, aluminum, and the like, as well as oxides, alloys, and mixtures comprising at least one of the foregoing metals. As with the electrolyte(s) and electrodes, the remaining sensor components are conventional.

As the exhaust gas stream travels through the exhaust system, the sensors monitor various aspects of fuel consumption such as when the A/F ratio is decreased or increased, the amount of fuel being consumed, and the like. The first and second sensors can be traditional stoichiometric "switch" sensors that signal the OBD when the fuel mixture comprises a lean A/F ratio (e.g., about 15:1 to about 45:1, or a ratio greater than a conventional stoichiometric A/F ratio of about 14.5) or a rich A/F ratio (e.g., about 8:1 to about 14:1, or a ratio less than a conventional stoichiometric A/F ratio of about 14.5), and A/F ratios falling between those rich and lean values. The third sensor can act as a WRAF /$NO_x$ sensor that provides a range of A/F ratio values, and can indicate, for example, the nitrogen oxides concentration in the exhaust stream. When placed in combination, the switch sensors and WRAF/$NO_x$ sensor can measure the regeneration time period, lean A/F ratio time period, and/or rich A/F ratio time period. This data, in conjunction with the engine output emission and catalysts performance model(s), can be used to determine, for example, the oxygen storage capacity values, nitrogen oxide storage capacity value, and estimate the nitrogen oxide reduction values and nitrogen oxide release values of the treatment devices.

For example, the combination of sensors can be used to effectively determine the nitrogen oxide conversion efficiency by calculating the nitrogen oxide storage capacity index of the system illustrated in FIG. 1. The nitrogen oxide storage capacity index can be based upon the combined volumes of the second and third treatment devices that can comprise nitrogen oxides adsorption materials. The OBD can calculate the nitrogen oxide storage capacity index by measuring the time differentials of the signals sent by the sensors. As the sensors monitor the catalytic treatment of the exhaust gas stream, the sensors send signals to the OBD. The OBD monitors the amount of time taken to adjust the A/F ratio from lean to rich, and rich to lean, and generates a response time differential based upon those A/F mixture transition periods. Response time differentials can be measured between several sensor configurations in the system illustrated in FIG. 1. Such sensor configurations can include a sensor 10 and sensor 40 configuration, a sensor 40 and sensor 60 configuration, and a sensor 10 and sensor 60 configuration. The engine control unit can adjust the A/F ratio based upon the sensor readings and response time differentials calculated by the OBD. Consequently, as the engine control unit adjusts the A/F ratio from a stoichiometric A/F ratio to a lean A/F ratio, and back to stoichiometric, or from a stoichiometric A/F ratio to a rich A/F ratio, and back to stoichiometric, and changes the engine operating conditions, the nitrogen oxide storage capacity index value can be determined, and its value as a function of time, i.e., extent of the engine operation, can be assessed for change.

The engine control unit can also adjust the A/F ratio based upon WRAF/$NO_x$ sensor readings to trigger the regeneration of catalyst material such as the nitrogen oxides adsorption material. When the second and third treatment devices experience sulfur poisoning, their respective nitrogen oxide adsorption materials become contaminated and are unable to effectively adsorb nitrogen oxides in the exhaust gas stream. In response, the engine control unit can implement a defined desulfation protocol by adjusting the A/F ratio to a rich A/F mixture, or an A/F ratio that is less than a conventional stoichiometric A/F ratio. The resulting richer A/F mixture causes desulfation by decomposing sulfates, which further causes the liberation of hydrogen sulfide and sulfur oxides from the catalyst material. Once the defined desulfation protocol is completed, normal engine control strategies and OBD functions are resumed.

Furthermore, the control strategy can also recognize and minimize emissions breakthrough, e.g., hydrocarbon and carbon monoxide, typically associated with the regeneration of nitrogen oxides catalyst material in conventional systems such as direct injection gasoline and similar lean burn systems, diesel and similar lean burn systems, and spark ignition systems. In these conventional systems, once a rich A/F mixture is sensed at a sensor downstream of one or more, or all of the nitrogen oxide treatment devices, a lean A/F mixture is commanded at the engine. At this moment, the rich A/F mixture still remains within the exhaust system. In a conventional exhaust system, this rich A/F mixture will eventually flow through the treatment device(s). Since the treatment device(s) no longer have any stored oxygen to reduce the hydrocarbons and carbon monoxide present in the exhaust gas stream, the hydrocarbons and carbon monoxide in the rich A/F mixture will be released into the environment. Consequently, the resulting breakthrough of rich A/F mixture causes a deficiency in the emissions efficiency of the exhaust system. In contrast, the second sensor illustrated in FIGS. 1 and 2 will sense the rich A/F mixture breakthrough prior to passage through the third sensor and exhaust port (not shown). The second sensor will then signal the engine control unit that regeneration is nearing completion. The engine control unit can then adjust the A/F ratio to a leaner A/F ratio, or a conventional stoichiometric A/F ratio in anticipation of the completion of the regeneration, thereby also minimizing hydrocarbon and carbon monoxide breakthrough.

Figure 9:
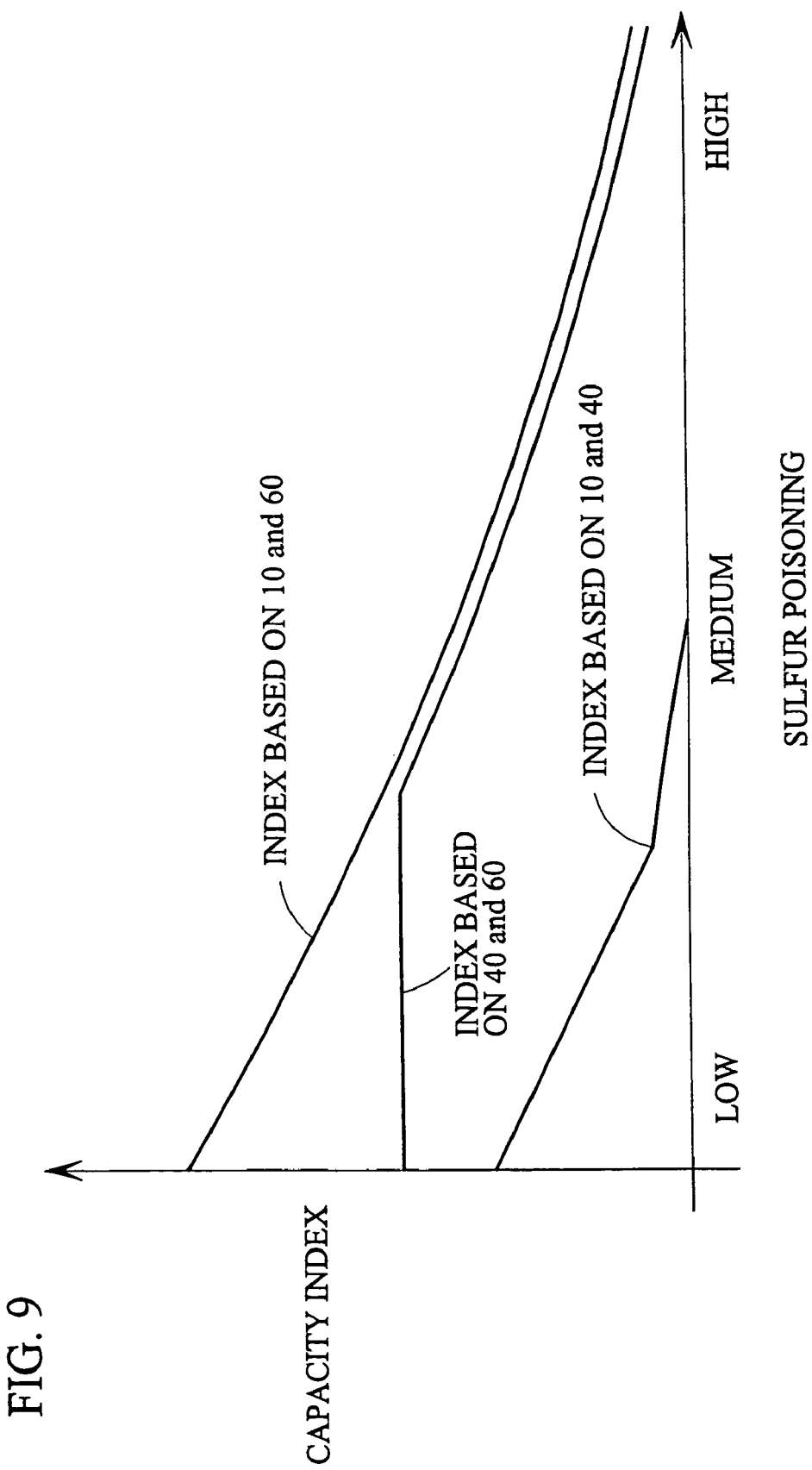
FIG. 9 illustrates three plots corresponding to three different sulfur contamination indices that compare the degree of sulfur poisoning to the nitrogen oxides storage capacity for a plurality of treatment devices.

As illustrated in FIGS. 1–2, an exhaust system for direct injection gasoline or lean burn systems can employ three treatment devices, such as a first treatment device 20, a second treatment device 30, and a third treatment device 50 (See FIG. 1), or a first treatment device 20, and a second treatment device comprising two devices, such as 30 and 50 of FIG. 1 (See FIG. 2). More particularly, the three treatment devices 20, 30, 50 can comprise, e.g., a warm-up treatment device and two treatment devices comprising nitrogen oxides catalyst material. The system can effectively treat a high percentage of the exhaust gas stream, such as greater than about 95%. As illustrated in FIGS. 3–8, an exhaust system for a diesel system can optionally employ a particulate filter device 70, and at least one treatment device 30, 50, or a particulate filter device 80 comprising a catalyst material (disposed upon a support) comprising, e.g., a nitrogen oxides adsorber material. In addition, another treatment device (not shown) can be included to serve as a warm-up device for heating the exhaust gas stream. As the systems illustrated in FIGS. 1–8 catalytically treat an exhaust gas stream, sulfur can impact the nitrogen oxides adsorption efficiency of the treatment devices. The sulfur contaminates and prevents the nitrogen oxides adsorption material from effectively adsorbing nitrogen oxides present in the exhaust gas stream. Referring now to FIG. 9, the OBD can determine the extent of sulfur poisoning of both second and third treatment devices 30, 50 by comparing the response time differentials for the first, second and third sensors 10, 40, 60. In turn, at least one sulfur contamination index, such as a first index, a second index and a third index, can be derived from the response time differentials and preferably a first sulfur contamination index and a second sulfur contamination index can be derived based upon the response time differentials between their respective sensors.

The first sulfur contamination index is based upon the response time differentials between the first sensor 10 and third sensor 60. The first sulfur contamination index monitors the nitrogen oxides capacity storage index, and nitrogen oxides conversion efficiency, of the combined volume of both the second and third treatment devices 30 and 50. Since the sulfur poisoning affects the inlet of a treatment device first, and then progressively affects the rest of the treatment device until reaching its outlet, the nitrogen oxide storage capacity of the second treatment device will indicate sulfur poisoning has occurred before the nitrogen oxide storage capacity of the third treatment device.

The second sulfur contamination index is based upon the response time differentials between the first sensor 10 and second sensor 40. The second sulfur contamination index monitors the nitrogen oxides storage capacity index, and nitrogen oxides conversion efficiency, of the volume of the second treatment device. Since sulfur poisoning affects the second treatment device first in the system illustrated in FIG. 1, the second index can quickly indicate a reduction in its nitrogen oxides conversion efficiency. Therefore, the second sensor 40 can monitor a slight decrease of, e.g., about 5%, in the total volume of the entire exhaust system.

By employing both the first and second sulfur contamination indexes, the degradation of the entire exhaust system can be determined more accurately. The second index can serve as a back-up or redundancy check for the entire system. As the second treatment device becomes severely degraded by sulfur poisoning, the second index can indicate that fact before sulfur poisoning becomes relatively extensive throughout the entire exhaust system. To maximize the usefulness of the first and second indexes the volumes of the second and third treatment devices can be proportioned. The nitrogen oxide adsorber material volume ratio between the second treatment device and third treatment device can be proportioned such that the amount of oxygen and nitrogen oxides stored by the third treatment device can be adequate to treat the rich A/F mixture remaining after regeneration takes place. Likewise, the nitrogen oxide adsorber material volume ratio can also be proportioned such that the entire nitrogen oxide adsorber capacity of the third treatment device is efficiently utilized.

The control strategy providing enhanced catalyst performance diagnostics possesses several advantages over conventional diagnostic systems. First, only a portion of the total volume of the entire exhaust system is monitored to indicate that sulfur poisoning is taking place. The system accurately monitors catalyst performance, as it progressively declines with sulfur poisoning, without requiring an excessively large decrease in system performance, such as a 40% to 60% decrease in the efficiency of the entire system, to accurately determine that sulfur contamination has occurred. As a result, the treatment devices operate with a higher degree of efficiency at a reduced cost to both the manufacturer and consumer.

In turn, the second sensor can also predict when regeneration of the nitrogen oxide adsorber material is completed. The engine control unit can then adjust the A/F mixture to a lean A/F mixture sooner, which impacts favorably upon emissions. Typically, conventional systems, such as direct injection gasoline and similar lean burn systems, diesel and similar lean burn systems, and spark ignition systems, cannot adjust the A/F ratio back to a preferred lean A/F mixture before additional emissions are released into the atmosphere. As a result, conventional exhaust systems typically experience high levels of carbon monoxide and hydrocarbon output immediately after nitrogen oxide adsorber materials are regenerated. In contrast, the diagnostic system embodiments illustrated in FIGS. 1–8 can rectify this sharp emissions increase due to its ability to predict when regeneration is completed.

Another advantage is the capability of the diagnostic system to function without requiring the fuel to contain a requisite amount of sulfur. The diagnostic system does not determine whether the exhaust system is experiencing sulfur poisoning based upon the amount of sulfur present in the fuel. Consequently, the diagnostic system can be implemented in automotive vehicles that operate in areas of the world where sulfur contaminated products are more prevalent than in the United States.

Yet another advantage is the capability of the diagnostic system to be implemented in various engine environments. The diagnostic system can be implemented in direct injection gasoline systems and similar lean burn systems, diesel systems and similar lean burn systems, and spark ignition environments.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for monitoring catalyst performance, comprising:

introducing an exhaust gas stream into an exhaust system that includes a plurality of treatment devices and a plurality of gas sensors disposed in fluid communication with said plurality of treatment devices, wherein said plurality of treatment devices comprises a first treatment device, a second treatment device, and a third treatment device, and said plurality of gas sensors comprise a first gas sensor disposed before said first treatment device, a second gas sensor disposed between said second treatment device and said third treatment device, and a third gas sensor disposed after said third treatment device, and further wherein at least two treatment devices comprise a nitrogen oxides adsorber material;

monitoring said exhaust gas stream using said plurality of gas sensors;

passing said exhaust gas stream through said plurality of treatment devices;

measuring a first response time differential between said first gas sensor and said second gas sensor, and a second response time between said first gas sensor and said third gas sensor;

calculating a sulfur contamination index based on said response time differentials between said plurality of gas sensors; and desulfating said treatment devices based upon said first response time, said second response time, and said sulfur contamination index and adjusting an air to fuel ratio to regenerate a catalyst material of one or more of said treatment devices.

2. The method of claim 1, further comprising monitoring said plurality of gas sensors using an on-board diagnostic system.

3. The method of claim 1, wherein said measuring further comprises collecting a plurality of responses by an on-board diagnostic system, wherein said responses further comprise a response time differential between a first gas sensor and a second gas sensor, a response time differential between said second gas sensor and a third gas sensor, and a response time differential between said first gas sensor and said third gas sensor.

4. The method of claim 1, wherein said three sulfur contamination indices further comprise a first sulfur contamination index based on a first gas sensor and a third gas sensor, a second sulfur contamination index based on a second sensor and said third sensor, and a third contamination index based on said first sensor and said second sensor.

5. The method of claim 1, further comprising measuring a nitrogen oxide storage capacity of one or more of said treatment devices.

6. The method of claim 5, further comprising determining a nitrogen oxide conversion efficiency of said one or more treatment devices.

7. The method of claim 6, further comprising using said nitrogen oxide conversion efficiency of said one or more treatment devices to determine whether said treatment devices are experiencing sulfur poisoning.

8. A catalyst performance diagnostics system, comprising:

a plurality of treatment devices, wherein said plurality comprises a first treatment device, a second treatment device, and a third treatment device;

a plurality of sensors disposed in fluid communication with said plurality of treatment devices, wherein said plurality of sensors comprise a first stoichiometric switch sensor disposed before said first treatment device, a second stoichiometric switch sensor disposed between said second treatment device and said third treatment device, and a third $NO_x$ sensor disposed after said third treatment device; and an on-board diagnostic system coupled to said plurality of sensors.

* * * * *